Dec. 3, 1963     T. A. WEIL     3,113,212

HIGH AND LOW LEVEL RADIATION METER

Filed Dec. 4, 1961

INVENTOR.
THOMAS A. WEIL
BY
*Kenway, Jenney & Hildreth*
ATTORNEYS

United States Patent Office 3,113,212
Patented Dec. 3, 1963

3,113,212
HIGH AND LOW LEVEL RADIATION METER
Thomas A. Weil, Wellesley Hills, Mass., assignor to
Twinco, Inc., Boston, Mass., a corporation of Massachusetts
Filed Dec. 4, 1961, Ser. No. 156,874
2 Claims. (Cl. 250—83.6)

This invention relates to radiation detectors and more particularly to a radiation meter suitable for a wide range of levels of radiation.

Existing radiation detectors fall generally into two categories. On the one hand, there are precise laboratory apparatus suitable for applications requiring great precision of measurement. At the other extreme, there are dosage indicators which are suitable for determining the total radiation to which a person has been subjected over an extended period of time. Neither category of devices is particularly well suited for the needs arising in connection with what is commonly called civil defense. In the first case, it is impractical to provide the average citizen with costly laboratory equipment costing hundreds of dollars. In addition, the complexity of such equipment increases the chances that it may develop difficulties with time and, therefore, the chance that repairs beyond the scope of an average repairman will be required.

In the second case, while the dosage meters are relatively inexpensive, exposure to the radiation must be incurred before the danger may be determined. Thus, safety cannot be assured unless a rate meter that gives immediate readings of radiation level is available to insure that the exposure is not of an unsafe level. While some dosage meters are utilized as a sort of rate meter by exposing the dosage device for a measured interval of time, such a meter is still slow and suitable only for relatively high levels of radiation.

Accordingly, it is an object of the present invention to provide a radiation meter which will provide an instantaneous determination of both relatively high and relatively low radiation levels.

Another object is to provide a radiation meter having high reliability and low initial cost.

A further object is to provide a radiation meter which can be simply maintained.

A still further object is to provide a radiation meter whose proper operation can be checked by radioactive sources safe to store in unprotected containers around human personnel.

These and other objects of the present invention are achieved in a radiation meter incorporating a tube responsive to radiation, such as a Geiger-Müller tube, within an integrating circuit wherein the average current is measured, rather than the counting rate. A primary feature of the present invention is the additional incorporation of the Geiger-Müller tube within a current multiplication circuit for the measurement of low radiation levels.

Figure 1:
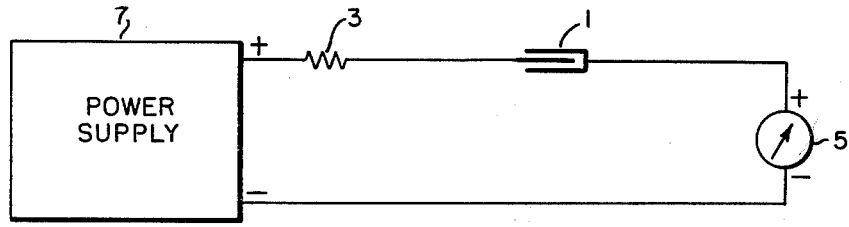
Figure 2:
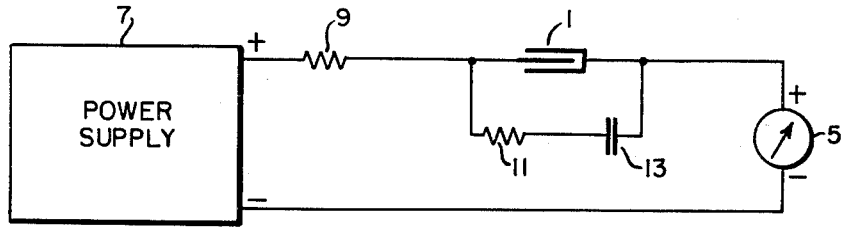
Figure 3:
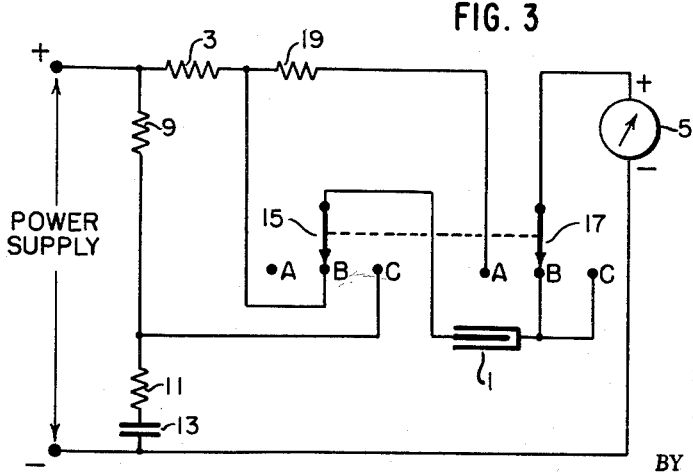

The invention likewise involves the several features and details of the radiation detector hereinafter described and illustrated in the accompanying drawings showing the invention in a preferred embodiment wherein FIG. 1 is a circuit diagram of an embodiment suitable for high radiation levels;

FIG. 2 is a circuit diagram of a radiation detector suitable for low radiation levels; and FIG. 3 is a circuit diagram of apparatus suitable for operation at both high and low radiation levels.

Referring to FIG. 1, the Geiger-Müller tube 1 is employed in an integrating circuit. The tube itself is placed in series with a resistor 3 and a microammeter 5. This series circuit is placed across the terminals of the power supply 7. The general mode of operation of the circuit of FIG. 1 is as follows. Radiation impinging upon the Geiger-Müller tube produces ionization of the gas within the Geiger tube. This ionization permits current to be conducted between the electrodes of the tube for a short period of time until the conduction is quenched by the action of the gases in the tube. Under relatively high levels of radiation, these conducting periods provide an aggregate current sufficient to give a usable indication on the microammeter 5. This arrangement is known as an integrating circuit. An integrating circuit is used to avoid the phenomenon known as saturation, in which high levels of radiation can produce dangerously misleading lower readings, as in ordinary Geiger counters. Thus, counters are not suited for civil defense purposes, and in fact, could be dangerous if used in such applications.

Suitable values have been ascertained for 700-volt Geiger-Müller tubes such as the tube available from the Raytheon Corporation as CK1044. $R_3$ may be in the 1 to 3 megohm range, and the microammeter 5 may be a 50-microampere meter. The Geiger-Müller tube, for example, can be designed to pass about 50 microamperes at 500 roentgens per hour so that this device will be suitable for radiation levels up to 500 roentgens per hour. Because such a tube must be physically small to avoid saturation at less than 500 roentgens per hour, in low radiation levels, say below 1 roentgen per hour, the meter needle displacement will be too small for even a qualitative indication.

Referring now to FIG. 2, apparatus according to my invention suitable for the detection of low radiation levels using a small Geiger-Müller tube is set forth. The Geiger-Müller tube 1 is connected in series with a resistor 9 and the indicating meter 5. This series combination is placed across the terminals of the power supply 7. However, in the embodiment of FIG. 2, additional circuit components are placed in parallel with the Geiger-Müller tube. Resistor 11 and capacitor 13 are connected in series and this series combination is placed in parallel with the Geiger-Müller tube 1. The operation of this circuit is as follows. During periods when no radiation is impinging on the Geiger-Müller tube 1, the capacitor 13 becomes charged through the series resistance composed of resistor 9, resistor 11, and the resistance of the indicating microammeter 5. When ionizing radiation impinges upon the Geiger-Müller tube 1, the tube will conduct and will remain conducting for the period of time it takes to discharge the capacitor 13 through the tube 1. Thus, even a single particle of ionizing radiation can be made to produce a noticeable indication on the microammeter. Resistor 11 serves not only to form part of the charging circuit for capacitor 13, but also to limit the peak value of the discharge current to a safe value when the Geiger-Müller tube 1 is triggered by ionizing raditaion. With the 700-volt Geiger-Müller tube discussed above, in connection with FIG. 1, 10,000 ohms has been found to be a suitable value for resistor 11. Utilizing the same 50-microampere meter movement, suitable values for resistor 9 and capacitor 13 are 1,500,000 ohms and .005 microfarad, respectively, to obtain a full scale indication at a radiation level of 1 roentgen per hour. Readings can thus be obtained well below 1 roentgen per hour, which is desirable for minimizing radioactive exposure and for decontamination.

It will be recognized that placing such a high capacitance across the Geiger-Müller tube is directly contrary to conventional practice. Normally, the capacitance across the Geiger-Müller tube is minimized to shorten resolving time. By decreasing this capacitance, the chance that the voltage across the tube will have recovered and be ready to respond to an immediately following ionizing impulse is maximized. Although the apparatus constructed according to the present invention will have a relatively long resolving time, the circuit of FIG. 2 permits the safe measurement of low radiation levels, and this circuit is not adversely affected by the increased resolving time.

A further advantage of the apparatus of FIG. 2 for civil defense purposes is that a compressed scale is provided. This compression results from the fact that an increase in radiation intensity does not produce a proportionate increase in the meter needle displacement. As the radiation intensity increases, the capacitor 13 is discharged proportionately more often, but it has had less time to recharge between discharges. Therefore, the average charging current, which is the current indicated by microammeter 5, is not increased proportionately to the rate of discharges.

While a particular Geiger tube has been mentioned as suitable, any Geiger tube may be employed with suitable changes in supply voltage and series resistances, and the dimensions of the tube will approximately determine the sensitivity of the instrument. Typically, such tubes will consist of a cylindrical cathode and an axial anode rod within this cathode. The space between is filled with a gas mixture. Typical gases for a self-quenching Geiger-Müller tube would be neon, argon and chlorine. Typically, such tubes are operated at voltages placing them in the so-called Geiger region which is above the minimum voltage required for proportional response but below that which would produce a continuous discharge, once radiation had triggered the tube.

Even though the tube is operated in a region wherein the applied voltage would not normally produce a continuous discharge, the provision of capacitor 13 of substantial value could produce arcs capable of destroying the tube when it is triggered. Resistor 11 serves to limit the value of discharge current to values which will not be destructive to the Geiger-Müller tube.

It has been found that utilizing a typical small 700-volt Geiger-Müller tube such as the CK1044 in the apparatus of FIG. 2, the radiation given off by an ordinary luminous radium dial watch is sufficient to obtain an average current of about 20 microamperes. The apparatus will detect approximately 1 milli-roentgen per hour, and 0.2 microcurie of radioactive material can be used as a suitable test sample. This low-level sensitivity is important in that it provides a safe means for checking operability. The Geiger-Müller tube and meter employed in the apparatus of FIG. 2 would normally also be employed in the apparatus of FIG. 1 within the same basic instrument. However, checking a Geiger-Müller radiation detector in its conventional form of FIG. 1 requires the use of a relatively dangerously high-level radiation sample, such as a milligram of radium, which presently costs $60.00. At the present time, a permit is required from the Atomic Energy Commission to possess samples of this strength of radioactive materials, except radium. Obviously, it is unsafe to possess such samples in the typical household, particularly since they may fall into the hands of young children. The sensitivity of the apparatus of FIG. 2, however, enables one to check the instrument with completely safe samples, such as the luminous radium dial on an ordinary timepiece. Thus, the home-owner can make certain that his instrument is in proper operating condition, even though he does not have access to dangerous levels of radiation.

Apparatus according to the embodiment of FIG. 3 provides for operation corresponding to that of the circuits of either FIG. 1 or FIG. 2 through the use of the ganged switches 15 and 17 in positions B or C respectively. Since the active elements are identical in the two circuits testing with connections according to position C of switches 15 and 17 insures that the meter, power supply, and Geiger-Müller tube of the apparatus according to position B are operating. Testing with the connection of position C can, as noted above, be done with an ordinary luminous radium dial, whereas testing the apparatus formed by the switches in position B would require a sample with a dangerously high radiation level. In addition, to insure that the resistor 3 has not developed an open circuit, the operation of switch 17 at position A places resistor 19 in series with resistor 3 and meter 5 across the power supply. Resistor 19 serves to limit the current to a value within the range of meter 5.

With the ganged switches 15 and 17 in position B as shown in FIG. 3, the effective circuit is identical to that of FIG. 1. With the ganged switches in position C, the circuit corresponds to FIG. 2 in its operation, but is not completely identical to that of FIG. 2. The meter 5 is still in a series position to measure the average current from the power supply, but it is now within the loop formed by tube 1, resistor 11, and capacitor 13. This variation is illustrative of the fact that the meter position may be varied substantially, so long as it is in a series position where it measures all, or a known fraction of the direct current delivered by the power supply.

For some applications, it may be desirable to provide remote location of the sensing means. For example, it might be desirable to measure outside radiation levels while inside a fallout shelter. In such cases, the leads to tube 1 can be provided by wires of some length, the rest of the apparatus remaining at a safe location convenient to the operator. This type of modification can be made in any of the above embodiments.

Those skilled in the electronic arts will recognize that changes can be made in the values of circuit components and operating voltages without departing from the scope of the present invention.

Having described my invention, I claim:

1. Radiation detection apparatus suitable for use over a wide range of radiation levels comprising a tube of the Geiger type, said tube being responsive to ionizing radiation, an indicating meter, said meter being responsive to direct current, a source of direct voltage, first switching means, said first switching means having input and output terminals, second switching means, said second switching means having input and output terminals, a first output position of said first and second switching means establishing a first circuit, said first circuit comprising a first resistor in series with said tube and said voltage source, said tube and said voltage source being in series with said meter, a second output position of said first and second switches comprising a second circuit, said second circuit including a second resistor in series with said tube, a third resistor and a capacitor, said third resistor and capacitor being connected in series, said series combination being in parallel with said tube, said meter being in series with said source and said tube, whereby said first and second output positions provide apparatus suitable for the measurement of high and low radiation levels respectively.

2. Radiation detection apparatus suitable for use over a wide range of radiation levels comprising a tube of the Geiger type, said tube being responsive to ionizing radiation, an indicating meter, said meter being responsive to direct current, a source of direct voltage, first switching means, said first switching means having input and output terminals, second switching means, said second switching means having input and output terminals, a first output position of said first and second switching means establishing a first circuit, said first circuit comprising a first resistor in series with said tube and said voltage source, said tube and said voltage source being in series with said meter, a second output position of said first and second switches comprising a second circuit, said second circuit including a second resistor in series with said tube, a third resistor and a capacitor, said third resistor and capacitor being connected in series, said series combination being in parallel with said tube, said meter being in series with said source and said tube, a third output position of said second switch establishing a test circuit comprising a fourth resistor, said fourth resistor being in series with said first resistor and said voltage source, said meter being in series with said voltage source, whereby said first and second output positions provide apparatus suitable for the measurement of high and low radiation levels respectively.

References Cited in the file of this patent

UNITED STATES PATENTS

| | | | |
|---|---|---|---|
| 2,838,679 | Kraayeveld | _____ | June 30, 1958 |
| 2,884,533 | Richard-Foy | _____ | Apr. 28, 1959 |